(12) United States Patent
Simon et al.

(10) Patent No.: US 6,593,403 B1
(45) Date of Patent: Jul. 15, 2003

(54) ADDITIVE MIXTURE FOR IMPROVING THE MECHANICAL PROPERTIES OF POLYMERS

(75) Inventors: Dirk Simon, Mutterstadt (DE); Rudolf Pfaendner, Rimbach (DE); Andreas Konrad Steinert, Langenfeld (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 83 days.

(21) Appl. No.: 09/694,861

(22) Filed: Oct. 24, 2000

(30) Foreign Application Priority Data

Jul. 6, 2000 (CH) .................................................. 1954/99

(51) Int. Cl.$^7$ ........................ C08K 5/1515; C08L 23/16
(52) U.S. Cl. ........................ 524/114; 524/268; 524/269; 524/502; 524/515; 525/240
(58) Field of Search ................................ 524/515, 114, 524/268, 269, 502; 525/240, 326.5

(56) References Cited

U.S. PATENT DOCUMENTS 5,037,888 A   8/1991   Vanderbilt .................. 525/108

FOREIGN PATENT DOCUMENTS

| DE | 19511579 | 3/1996 |
| EP | 0702704 | 2/1998 |
| EP | 0922729 | 6/1999 |
| WO | 97/30112 | 8/1997 |
| WO | WO 97/30112 | * 8/1997 |

OTHER PUBLICATIONS

Abstract for DE 19511579 (1996), Dieter et. al.

* cited by examiner

Primary Examiner—Robert D. Harlan
(74) Attorney, Agent, or Firm—Tyler A. Stevenson

(57) ABSTRACT

The invention relates to a composition comprising
a) at least one polyolefin or vinyl polymer;
b) at least one di- or poly-functional (co)polymer or (co)oligomer having a glass transition temperature of less than 10° C., wherein the functional group is a carbon-carbon double bond, an epoxy group, an amine group, a carboxylic acid group, a carboxylic acid ester group or a carboxylic anhydride group, an OH group, an SH group or an isocyanate group, and
c) a multifunctional epoxide, which is different from the di- or poly-functional (co)polymer or (co)oligomer wherein the functional group is an epoxy group.

The invention also relates to a method of improving the mechanical properties of polyolefins and to the polyolefin plastics articles produced thereby and to the use of di- or poly-functional (co)polymers or (co)oligomers having a glass transition temperature of less than 10° C. together with a multifunctional epoxy compound in improving the mechanical properties of polyolefins.

11 Claims, No Drawings

ADDITIVE MIXTURE FOR IMPROVING THE MECHANICAL PROPERTIES OF POLYMERS

The invention relates to a composition for improving the mechanical properties of polyolefins and vinyl polymers, especially polyethylene, polypropylene and also copolymers and mixtures thereof. The plastics may be in the form of virgin material or recycled material. Examples that may be mentioned include polyethylene materials of the kind used in plastics fuel containers (PFCs). The invention relates also to a method of improving the mechanical properties and increasing the molecular weight of the afore-mentioned plastics by chemical modification, to the use of the additive combination according to the invention in improving the mechanical properties of plastics and also to the modified plastics product obtained by the said method.

Although they are employed in many fields of use, technical materials based on polyolefins and vinyl polymers are unable to meet all of the demands that the market requires. An improvement in their properties is desirable, especially as regards their mechanical properties, for example impact strength at low temperatures.

Plastics such as polyethylene (PE), polypropylene (PP), polyvinyl chloride (PVC), polystyrene (PS) etc. can, moreover, be damaged by processing and by their use, often for many years, under the influence of thermal stress, oxidation, weathering and light so that the stability of the material is no longer assured and the physical and mechanical properties deteriorate significantly. A consequence of that damage is that the resulting recycled materials cannot be used again for the original application. For example, because of inadequate long-term stability and poor mechanical properties, HDPE recycled from used plastics fuel containers (PFCs) cannot be re-used as the sole material in the production of new PFCs.

EP 702 704 B1 describes the use of an additive combination for stabilising recycled thermo-plastics, by means of which it is possible to improve the mechanical properties of the material. The improvement is, however, not adequate, especially in respect of low temperature impact strength.

The aim of the present invention is accordingly to provide a new additive combination by means of which it is possible to obtain plastics that have, compared with the additives known hitherto, improved mechanical properties, especially improved impact strength. In particular, the addition of such an additive system should also make possible complete and unlimited re-use, for the same application, of HDPE recycled from used plastics fuel containers.

Plastics fuel containers are mass-produced by means of extrusion blow moulding. That type of process, which has short cycle times and many further process parameters, makes high demands of the quality of the HDPE starting material used (thermodynamic properties, Theological properties at high and low shear rates, surface properties in the melt and on cooling of the hollow moulded article, inter alia).

In such a process, used plastics fuel containers (PFCs) are processed for example by comminution, removal of petrol/diesel residues by extraction, for example using solvents. During extraction with solvents (e.g. hexane or other readily volatile alkanes or alkane mixtures), not only are the contaminants (petrol/diesel residues etc.) removed but active stabiliser residues that may be present are also removed. Because of the prior damage that the material has additionally undergone, re-use in demanding applications (for example, in a closed cycle as plastics fuel containers) is virtually impossible.

The use of recycled polyethylene as a constituent of multilayer fuel tanks is described many times in the prior art but, in view of the poorer mechanical properties of the recycled material compared with virgin material, the recycled material is not used in the outer layers of the blow-moulded article. Moreover, the proportion thereof in the product is, at present, max. 45% by weight [*Kunststoffe* 82, (1992), 3, 201–206].

The use of mixtures based on commercially available primary and secondary anti-oxidants is merely able to stabilise the material in the processing process and for the duration of its use; an improvement in mechanical properties, however, is not achieved [R. Gächter, H. Müller, "Kunststoff-Additive", 3rd edition 1989, 26–31+65–74, Carl Hanser Verlag, Munich].

The use of an additive combination comprising at least one multifunctional oxirane in addition to anti-oxidants is described in EP-702 704 B1. The said system can be used for stabilising recycled thermoplastics and modifying the rheology thereof and serves, inter alia, to improve the mechanical properties of the material. However, an improvement in the mechanical properties at low temperatures (<0° C.), especially low temperature impact strength, is not achieved as a result.

It has now been found that that problem can be solved using a composition comprising a material based on polyolefins or vinyl polymers and comprising at least one polymer or oligomer modified by functional groups and comprising a multifunctional epoxide.

It can be advantageous to add at least one anti-oxidant or further processing stabiliser in addition.

The addition of that multifunctional polymeric component results in a further improvement in impact strength, especially in low temperature impact strength at temperatures <0° C., as required for plastics fuel containers (PFCs).

The invention relates to a composition comprising a) at least one polyolefin or vinyl polymer;

b) at least one di- or poly-functional (co)polymer or (co)oligomer having a glass transition temperature of less than 10° C., wherein the functional group is a carbon-carbon double bond, an epoxy group, an amine group, a carboxylic acid group, a carboxylic acid ester group or a carboxylic anhydride group, an OH group, an SH group or an isocyanate group, and c) a multifunctional epoxide which is different from the di- or poly-functional (co)polymer or (co)oligomer wherein the functional group is an epoxy group.

The present invention relates also to a composition comprising a) a recycled material of at least one polyolefin or vinyl polymer;

b) at least one di- or poly-functional (co)polymer or (co)oligomer having a glass transition temperature of less than 10° C., wherein the functional group is a carbon-carbon double bond, an epoxy group, an amine group, a carboxylic acid group, a carboxylic acid ester group or a carboxylic anhydride group, an OH group, an SH group or an isocyanate group.

Preference is given to a composition wherein the polyolefin or vinyl polymer is a recycled material.

In the context of the present invention, recycled material is understood to be a polyolefin or vinyl polymer which has undergone prior damage and which has been collected and taken for reprocessing.

The polyolefin or vinyl polymer which has undergone prior damage is, for example, polyolefin obtained from collections from households, retail businesses (e.g. supermarkets) and in industrial concerns (e.g. stretch films, sacks etc.) and may be, for example, films, bags, bottles and other containers or foamed plastics. However, plastics which have undergone prior damage as a result of use, storage or processing, for example production waste (films etc.) or separately collected scrap materials (agricultural sheeting, vehicle parts etc.), may also be re-used.

Preference is given to recycled polyolefin materials, especially of HDPE, and special preference is given to used vehicle fuel tanks of plastics.

Examples of vinyl polymers are polyvinyl chloride, polystyrene, especially syndiotactic polystyrene and its copolymers (e.g. with acrylonitrile), acrylate polymers, polymethyl methacrylate or polyvinyl acetate.

Preference is given to a composition wherein the vinyl polymer is a polystyrene, polyacrylonitrile or a copolymer thereof.

Examples of polyolefins are:
1. polymers of mono- and di-olefins, for example polypropylene, polyisobutylene, polybutene-1, poly-4-methylpentene-1, polyisoprene or polybutadiene and polymers of cycloolefins such as cyclopentene or norbornene; also, polyethylene (which may optionally be crosslinked), e.g. high-density polyethylene (HDPE), high-density and high molecular weight polyethylene (HDPE-HMW), high-density and ultrahigh molecular weight polyethylene (HDPE-UHMW), medium-density polyethylene (MDPE), low-density polyethylene (LDPE), linear low-density polyethylene (LLDPE), branched low-density polyethylene (BLDPE).

Polyolefins, that is to say polymers of monoolefins, as mentioned by way of example in the previous paragraph, especially polyethylene and polypropylene, can be produced according to various processes, especially according to the following methods:
   a) by free-radical polymerisation (usually at high pressure and high temperature)
   b) by means of a catalyst, the catalyst usually comprising one or more metals of Group IVb, Vb, VIb or VIII. Those metals usually have one or more ligands such as oxides, halides, alcoholates, esters, ethers, amines, alkyls, alkenyls and/or aryls, which may be either π- or δ-coordinated. Those metal complexes may be free or fixed on supports, for example on activated magnesium chloride, titanium(III) chloride, aluminium oxide or silicon oxide. Those catalysts may be soluble or insoluble in the polymerisation medium. The catalysts may be active as such in the polymerisation or further activators may be used, for example metal alkyls, metal hydrides, metal alkyl hydrides, metal alkyl oxides or metal alkyloxanes, the metals being elements of Groups Ia, IIa and/or IIIa. The activators may be modified, for example, with further ester, ether, amine or silyl ether groups. Those catalyst systems are usually termed Phillips, Standard Oil Indiana, Ziegler (-Natta), TNZ (Du Pont), metallocene or Single Site Catalysts (SSC).
2. Mixtures of the polymers mentioned under 1), e.g. mixtures of polypropylene with polyisobutylene, polypropylene with polyethylene (e.g. PP/HDPE, PP/LDPE) and mixtures of different types of polyethylene (e.g. LDPE/HDPE, LDPE/LLDPE).
3. Copolymers of mono- and di-olefins with one another or with other vinyl monomers, e.g. ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or copolymers of ethylene with acrylic acid and salts thereof (ionomers), and terpolymers of ethylene with propylene and a diene, e.g. hexadiene, dicyclopentadiene or ethylidenenorbornene; also, mixtures of such copolymers with one another and with polymers mentioned under 1), e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, e.g. polyamides.

The material need not be a pure polyolefin but may also be a blend consisting only partly of a polyolefin polymer.

Preference is given to a composition wherein the polyolefin is polyethylene, polypropylene or a copolymer thereof.

The polyfunctional (co)polymer or (co)oligomer is preferably selected from the group of homo- and co-polymers of isoprene, butadiene, chloroprene, styrene/butadiene, acrylonitrile/butadiene, acrylonitrile/chloroprene, ethylenes, isobutylenes, ethylene/α-olefins such as propylene, 1-butene, 1-pentene, 1-hexene, 1-heptene, 1-octene, ethylene/propylene/diene, ethylene/acrylate, ethylene/vinyl acetate, acrylates, epichlorohydrin, ethylene oxide, propylene oxide, dimethylsiloxane and methyl-phenyl-siloxane.

The di- or poly-functional (co)polymers or (co)oligomers having a glass transition temperature of less than 10° C. are, for example, commercially available or can be prepared in known manner from commercial products.

Commercially available (co)polymers or (co)oligomers that have a glass transition temperature of less than 10° C. are additionally functionalised by means of polymer-analogous reaction. Many of the basic polymers (e.g. (co)polymers of isoprene, butadiene, chloroprene, styrene/butadiene, acrylonitrile/butadiene, acrylonitrile/chloroprene, ethylene/propylene/diene) have unsaturated groups, which are used, for example, for crosslinking (vulcanisation). However, the unsaturated groups can also be used to introduce further specific functional groups. For example, EP-A-804 503 describes the grafting of EPDM with maleic anhydride. Di- or poly-functional polymers are obtained thereby.

Monomers from which polymers having a glass transition temperature of less than 10° C. can be obtained are described, for example, in Sächtling, Kunststoff-Taschenbuch, 26th edition 1995 pp. 727–736. They are polymerised in such a manner that products having at least two specific functional groups are formed directly. For example, functionalised initiators may be used for initiation of the polymerisation or functionalised termination reagents may be used for termination of the polymerisation so that specific functional groups can be introduced as terminal groups during or following on from the polymerisation. That is described, for example, in DE 4 344 082 for a process for the preparation of secondary aminoalkyl-functionalised polysiloxane. Difunctional polymers are obtained that may be used within the context of the present invention.

Especially preferred di- or poly-functional (co)polymers or (co)oligomers having a glass transition temperature of less than 10° C. are, for example, the commercial products mentioned below:

Polysiloxanes that are functionalised at the chain ends by amine, oxirane or vinyl groups, e.g. Tegomer® products of Th. Goldschmidt AG.

Butadiene-acrylonitrile copolymers that are functionalised at the chain ends by amine, oxirane or vinyl groups, e.g. Hycar® products of BF Goodrich.

Ethylene copolymers that are functionalised along the polymer backbone by maleic anhydride groups, are for example Exxelor® products of Exxon Chemical.

Ethylene homopolymers or ethylene-propylene copolymers that are functionalised along the polymer backbone by carboxylic acid, carboxylic anhydride or oxirane groups, e.g. Fusabond® and Elvaloy® products of Du Pont de Nemours or Royaltuf® and Polybond® products of Uniroyal Chemical.

The glass transition temperature of that component is less than 10° C., preferably less than 0° C. In cases where copolymers have two glass transition temperatures it is sufficient for one of the two glass transition temperatures to be less than 10° C. or 0° C., respectively.

Preference is given to a composition wherein the di- or poly-functional (co)polymer or (co)oligomer is a polysiloxane, polybutadiene or butadiene-acrylonitrile copolymer containing terminal amine, epoxy or vinyl groups, an ethylene copolymer containing maleic anhydride groups, or an ethylene homopolymer or ethylene-propylene copolymer containing carboxylic acid, carboxylic anhydride or epoxy groups.

An especially preferred di- or poly-functional (co)polymer or (co)oligomer is a polysiloxane polymer containing terminal amine or epoxy groups.

The epoxide compounds c) that may be used according to the invention can have an aliphatic, aromatic, cycloaliphatic, araliphatic or heterocyclic structure; they contain epoxy groups as side groups. The epoxy groups are preferably connected to the remainder of the molecule as glycidyl groups by means of ether or ester bonds, or the compounds are N-glycidyl derivatives of heterocyclic amines, amides or imides. Epoxide compounds of those kinds are generally known and are commercially available.

The epoxide compounds contain epoxy radicals, especially those of formula A

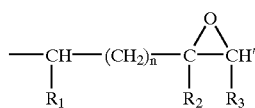

(A)

which are bonded directly to carbon, oxygen, nitrogen or sulfur atoms, wherein $R_1$ and $R_3$ are both hydrogen, $R_2$ is hydrogen or methyl and n=0, or wherein $R_1$ and $R_3$ together are —$CH_2$—$CH_2$— or —$CH_2$—$CH_2$—$CH_2$—, in which case $R_2$ is hydrogen and n=0 or 1.

Examples of epoxide compounds that may be mentioned are:

I) Polyglycidyl and poly(β-methylglycidyl)esters obtainable by reaction of a compound having at least two carboxyl groups in the molecule and epichlorohydrin or glycerol dichlorohydrin or β-methyl-epichlorohydrin. The reaction is advantageously carried out in the presence of bases.

Aliphatic polycarboxylic acids may be used as compounds having at least two carboxyl groups in the molecule. Examples of those polycarboxylic acids are glutaric acid, adipic acid, pimelic acid, suberic acid, azelaic acid, sebacic acid and dimerised or trimerised linoleic acid.

Cycloaliphatic polycarboxylic acids may, however, also be used, for example tetrahydrophthalic acid, 4-methyltetrahydrophthalic acid, hexahydrophthalic acid and 4-methylhexahydrophthalic acid.

It is also possible to use aromatic polycarboxylic acids, for example phthalic acid, isophthalic acid, trimellitic acid and pyromellitic acid.

Carboxyl-terminated adducts, for example of trimellitic acid and polyols, e.g. glycerol and 2,2-bis(4-hydroxycyclohexyl)propane, may also be used.

II) Polyglycidyl and poly(β-methylglycidyl)ethers obtainable by reaction of a compound having at least two free alcoholic hydroxy groups and/or phenolic hydroxy groups and a suitably substituted epichlorohydrin under alkaline conditions, or in the presence of an acid catalyst and subsequent alkali treatment.

Ethers of that kind are derived, for example, from acyclic alcohols, such as ethylene glycol, diethylene glycol and higher poly(oxyethylene)glycols, propane-1,2-diol, or poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, bis-trimethylolpropane, pentaerythritol, sorbitol, and also from polyepichlorohydrins.

However, they may also be derived, for example, from cycloaliphatic alcohols such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they may have aromatic rings, for example N,N-bis(2-hydroxyethyl)aniline or p,p'-bis(2-hydroxyethylamino)diphenylmethane.

The epoxide compounds may also be derived from mononuclear phenols, for example from resorcinol or hydroquinone, or they may be based on polynuclear phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenylsulfone, or on condensation products of phenols with formaldehyde that are obtained under acid conditions, for example phenol novolaks.

III) Poly(N-glycidyl) compounds obtainable by dehydrochlorination of the reaction products of epichlorohydrin with amines containing at least two amino hydrogen atoms. Such amines are, for example, aniline, toluidine, n-butylamine, bis(4-aminophenyl)methane, m-xylylenediamine and bis(4-methylaminophenyl)methane, and also N,N,O-triglycidyl-m-aminophenol and N,N,O-triglycidyl-p-aminophenol.

The poly(N-glycidyl) compounds may, however, also include N,N'-diglycidyl derivatives of cycloalkylene ureas, for example ethylene urea or 1,3-propylene urea, and N,N'-diglycidyl derivatives of hydantoins, such as of 5,5-dimethylhydantoin.

IV) Poly(S-glycidyl) compounds, for example di-S-glycidyl derivatives that are derived from dithiols, for example ethane-1,2-dithiol and bis(4-mercaptomethylphenyl)ether.

V) Epoxide compounds having a radical of formula A wherein $R_1$ and $R_3$ together are —$CH_2$—$CH_2$— and n is 0 are for example bis(2,3-epoxycyclopentyl)ether, 2,3- epoxycyclopentylglycidyl ether and 1,2-bis(2,3-epoxycyclopentyloxy)ethane. An epoxy resin having a radical of formula A wherein $R_1$ and $R_3$ together are —$CH_2$—$CH_2$— and n is 1 is, for example, 3,4-epoxy-6-methyl-cyclohexanecarboxylic acid (3',4'-epoxy-6'-methyl-cyclohexyl)methyl ester.

Suitable epoxides are, for example:

a) liquid diglycidyl ethers of bisphenol A, for example Araldite®GY 240, Araldite®GY 250, Araldite®GY 260, Araldite®GY 266, Araldite®GY 2600, Araldite®MY 790;

b) solid diglycidyl ethers of bisphenol A, for example Araldite®GT 6071, Araldite®GT 7071, Araldite®GT 7072, Araldite®GT 6063, Araldite®GT 7203, Araldite®GT 6064, Araldite®GT 7304, Araldite®GT 7004, Araldite®GT 6084, Araldite®GT 1999, Araldite®GT 7077, Araldite®GT 6097, Araldite®GT 7097, Araldite®GT 7008, Araldite®GT 6099, Araldite®GT 6608, Araldite®GT 6609, Araldite®GT 6610;

c) liquid diglycidyl ethers of bisphenol F, for example Araldite®GY 281, Araldite®GY282, Araldite®PY 302, Araldite®PY 306;

d) solid polyglycidyl ethers of tetraphenylethane, for example CG Epoxy Resin®0163;

e) solid and liquid polyglycidyl ethers of phenol-formaldehyde novolak, for example EPN 1138, EPN 1139, GY 1180, PY 307;

f) solid and liquid polyglycidyl ethers of o-cresol-formaldehyde novolak, for example ECN 1235, ECN 1273, ECN 1280, ECN 1299;

g) liquid glycidyl ethers of alcohols, for example Shell® glycidyl ether 162, Araldite®DY 0390, Araldite®DY 0391;

h) liquid glycidyl ethers of carboxylic acids, for example Shell®Cardura E terephthalic acid ester, trimellitic acid ester, Araldite®PY 284;

i) solid heterocyclic epoxy resins (triglycidyl isocyanurate), for example Araldite® PT 810;

j) liquid cycloaliphatic epoxy resins, for example Araldite®CY 179;

k) liquid N,N,O-triglycidyl ethers of p-aminophenol, for example Araldite®MY 0510;

l) tetraglycidyl-4,4'-methylenebenzamine or N,N,N',N'-tetraglycidyldiaminophenylmethane, for example Araldite®MY 720, Araldite®MY 721.

Optionally, a mixture of epoxide compounds of different structures may also be used.

The epoxide compounds contain at least two groups of formula

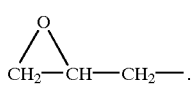

Special preference is given to compounds of types (I) to (III) and mixtures thereof

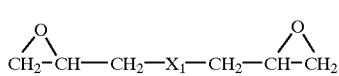
(B)

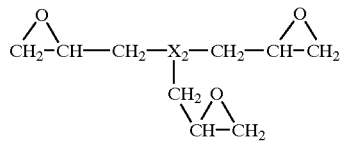
(C)

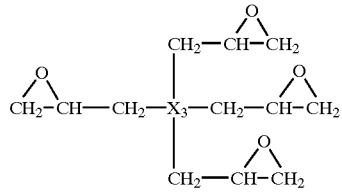
(D)

wherein $X_1$, $X_2$ and $X_3$ are cyclohexylene, phenylene or naphthylene, which may be unsubstituted or substituted, and $X_1$ may, in addition, be an unsubstituted or substituted radical of formula

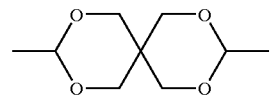

and $X_2$ may, in addition, be an unsubstituted or substituted radical of formula

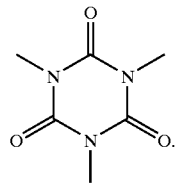

Suitable substituents for the afore-mentioned radicals are —O—, —S—, —C(O)—, —C(O)O—, —S(O)—, —S($O_2$)—, —C($CF_3$)$_2$—, alkyl, alkylene, aryl, arylene, alkoxy, aryloxy and halogen; identical or different substituents may be present more than once or the substituents themselves may in turn be substituted. Suitable alkyl radicals are, for example, $C_1$–$C_{18}$alkyl radicals, such as methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl and n-octadecyl and other branched isomers.

Suitable alkylene and alkoxy radicals can be derived notionally from the afore-mentioned alkyl radicals by removal of a further hydrogen atom and by addition of an oxygen atom, respectively.

Suitable aryl radicals are, for example, radicals having from 6 to 20 carbon atoms, such as phenylene, biphenylene and naphthylene.

Suitable arylene and aryloxy radicals can be derived notionally from the afore-mentioned aryl radicals by removal of a further hydrogen atom and by addition of an oxygen atom, respectively.

Preference is given to radicals of the following formulae:
for $X_1=$
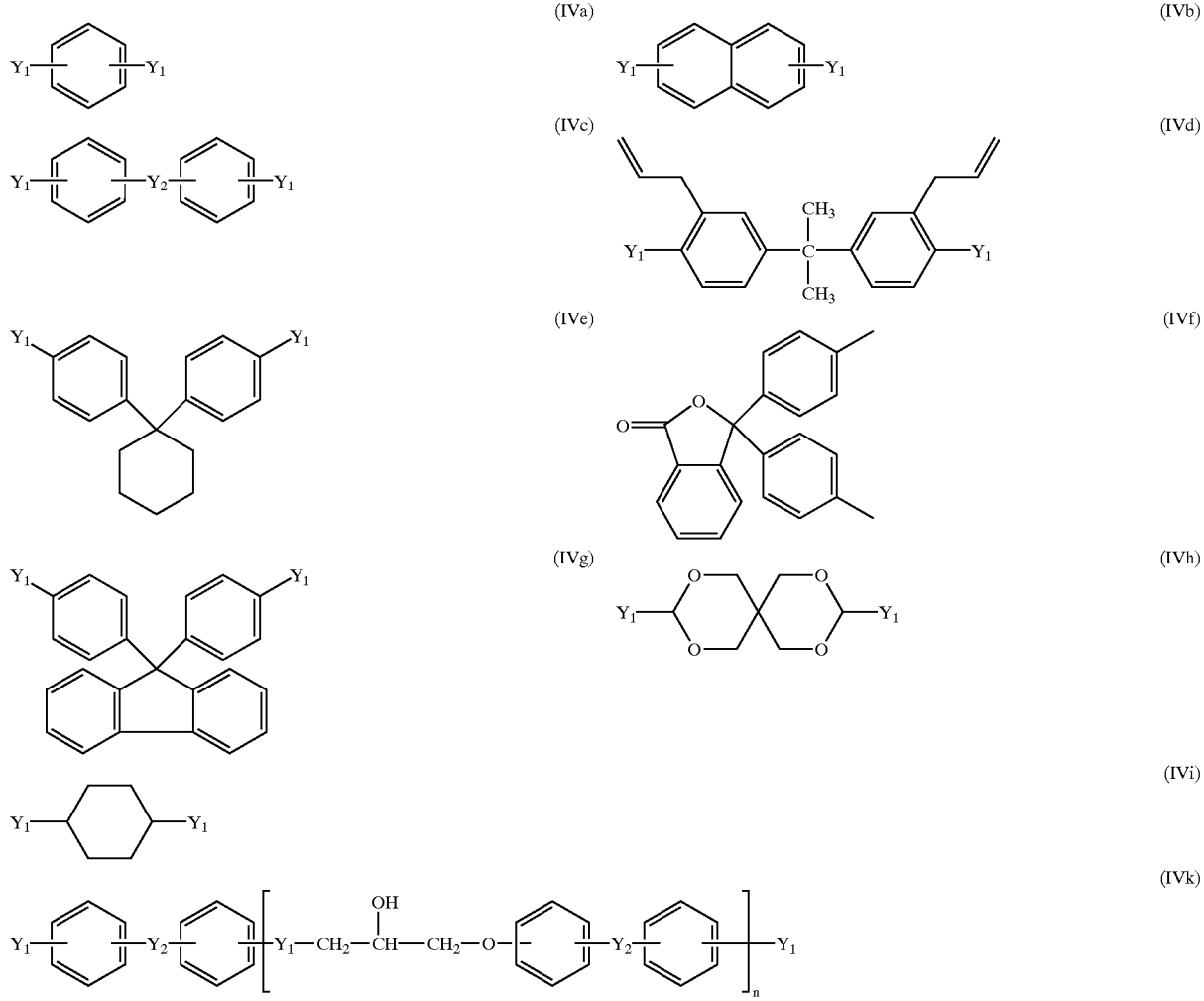
for $X_2=$
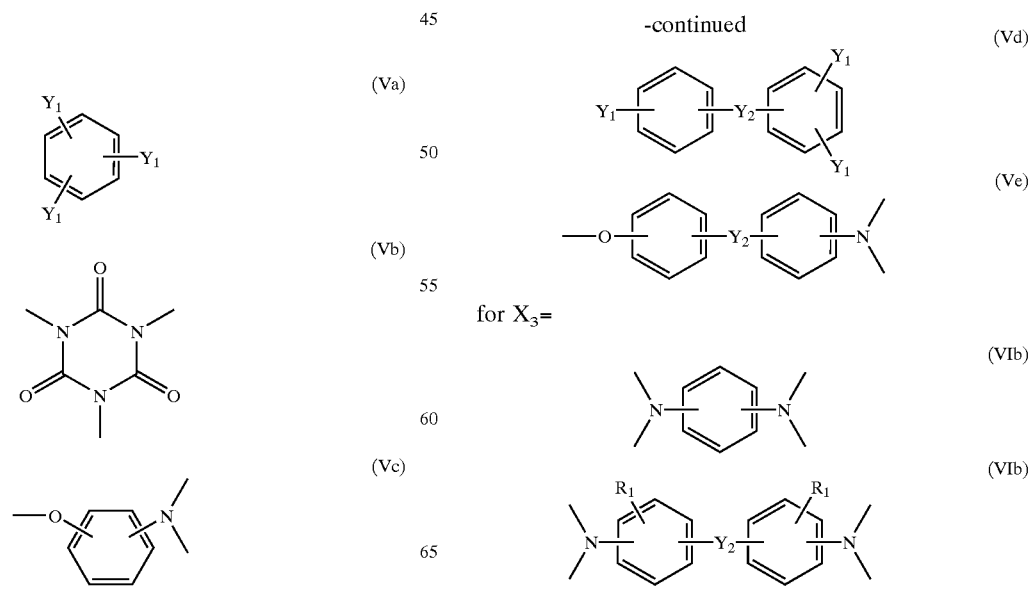

-continued

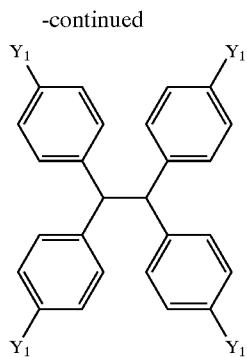
(VIc)

wherein $Y_1$ is a direct bond, —O—, —S— or —C(O)O—, $Y_2$ is a direct bond, —SO$_2$—, —CO—, —S—, —SO—, —CH$_2$—, —C(CH$_3$)$_2$— or —C(CF$_3$)$_2$— and n=is from 1 to 10.

The aromatic rings are optionally mono- or poly-substituted by alkyl, aryl, alkoxy, aryloxy or halogen, as explained in greater detail hereinbefore.

Preference is given to aromatic epoxide compounds.

As the epoxide component special preference is given to the compounds

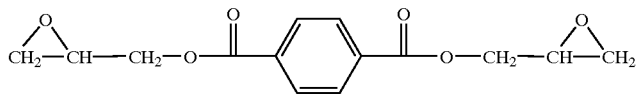

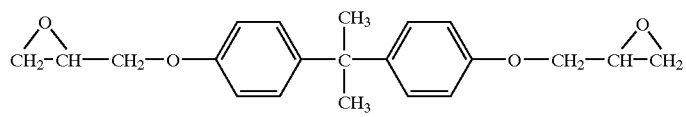

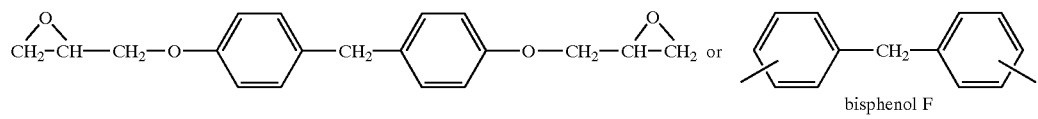

bisphenol F

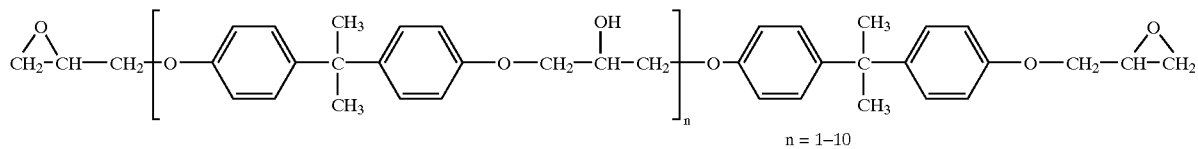

n = 1–10

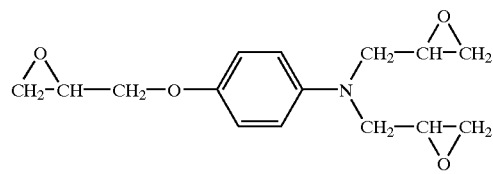

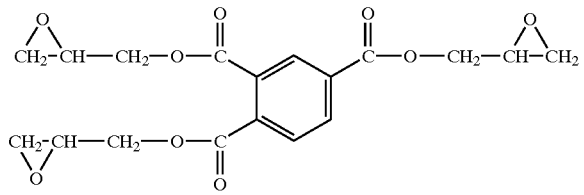

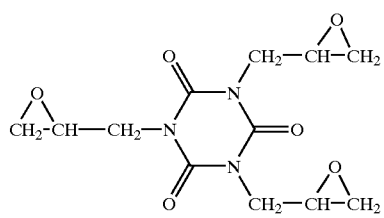

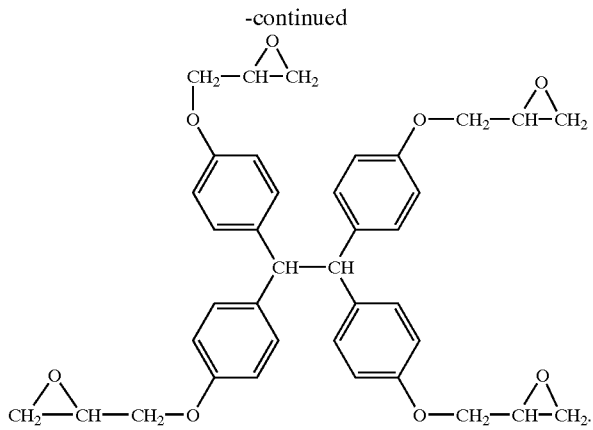

The composition preferably contains the di- or polyfunctional (co)polymer or (co)oligomer in an amount of from 0.1 to 20% by weight, especially from 0.5 to 10% by weight and more especially from 1 to 3% by weight, based on the polyolefin or vinyl polymer.

The composition preferably contains the multifunctional epoxide in an amount of from 0.01 to 5% by weight, especially from 0.1 to 3% by weight and more especially from 0.5 to 2% by weight, based on the polyolefin or vinyl polymer.

The weight ratio of di- or poly-functional (co)polymer or (co)oligomer to multifunctional epoxide is preferably from 50:1 to 1:5, especially from 20:1 to 1:2.

The composition preferably also comprises further processing stabilisers, for example phenolic anti-oxidants, phosphonates, phosphites or benzofuranones.

The anti-oxidants of the sterically hindered phenol type are generally known as anti-oxidants for organic materials and are frequently used for stabilising polymers. The said compounds preferably contain at least one group of formula (X)

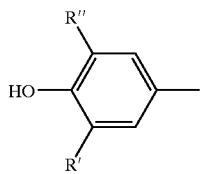

wherein R' is hydrogen, methyl or tert-butyl and R" is unsubstituted or substituted alkyl or substituted alkylthioalkyl.

Special preference is given to compounds that contain at least one group of formula

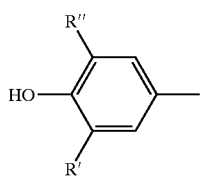

wherein R' is methyl or tert-butyl and R" is unsubstituted or substituted alkyl or substituted alkylthioalkyl.

Examples of such phenol anti-oxidants are:
1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1'-methyltridec-1'-yl)-phenol and mixtures thereof.
2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.
3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.
4. Tocopherols, for example α-tocopherol, β-tocopherol, γ-tocopherol, δ-tocopherol and mixtures thereof (Vitamin E).
5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.
6. Alkylidene bisphenol, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4- hydroxy-5-methylphenyl)-dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

7. O—, N— and S-benzyl compounds, for example 3,5,3',5'-tetra-tert-butyl-4,4'-dihydroxydibenzyl ether, octadecyl-4-hydroxy-3,5-dimethylbenzyl mercaptoacetate, tris(3,5-di-tert-butyl-4-hydroxybenzyl) amine, bis(4-tert-butyl-3-hydroxy-2,6-dimethylbenzyl) dithioterephthalate, bis(3,5-di-tert-butyl-4-hydroxybenzyl)sulfide, isooctyl-3,5-di-tert-butyl-4-hydroxybenzyl mercaptoacetate.

8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, didodecylmercaptoethyl 2,2-bis(3,5-di-tert-butyl-4-hydroxybenzyl)malonate, di-[4-(1,1,3,3-tetramethylbutyl)phenyl]2,2-bis(3,5-di-tert-butyl-4-hydroxybenzyl)malonate.

9. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

10. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

11. Acylaminophenols, for example 4-hydroxylauric acid anilide, 4-hydroxystearic acid anilide, N-(3,5-di-tert-butyl-4-hydroxyphenyl)carbamic acid octyl ester.

12. Esters of β-(3,5-di-tert-butyl-4-hydroxyphenyl) pronionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2] octane.

13. Esters of β-(5-tert-butyl-4-hydroxy-3-methylphenyl) propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2] octane.

14. Esters of β-(3,5-dicyclohexyl-4-hydroxyphenyl) propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2] octane.

15. Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2] octane.

16. Amides of β-(3,5-di-tert-butyl-4-hydroxyphenyl) propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

Preference is given to the anti-oxidants mentioned under points 7, 9, 10, 12, 13, 14 and 16, especially points 7, 9, 10 and 12.

Further especially preferred compounds are:

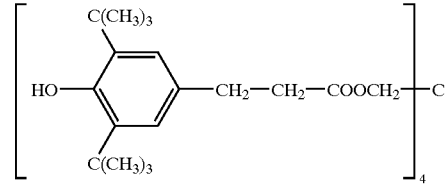

β-(3,5-di-tert-butyl-4-hydroxyphenyl)propionic acid ester of pentaerythritol

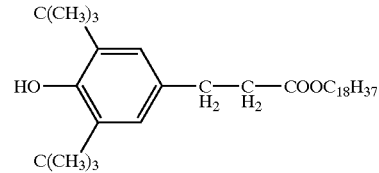

β-(3,5-di-tert-butyl-4-hydroxyphenyl)propionic acid octadecyl ester

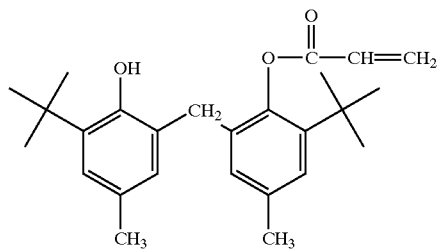

{2-propenoic acid 2-(1,1-dimethylethyl)-6-[[3-(1,1-dimethylethyl)-2-hydroxy-5-methylpheny]-methyl]-4-methylphenyl ester};

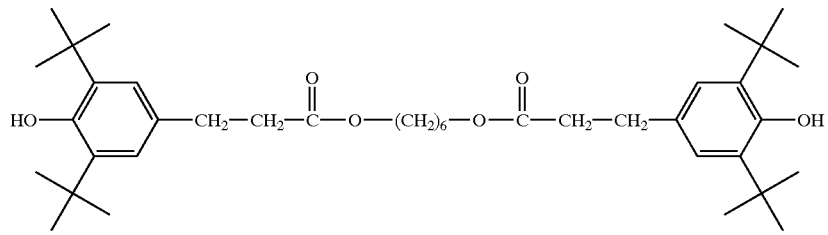

β{3,5-bis(1,1-dimethylethyl)-4-hydroxy-phenylpropanoic acid 1,6-hexanediyl ester};

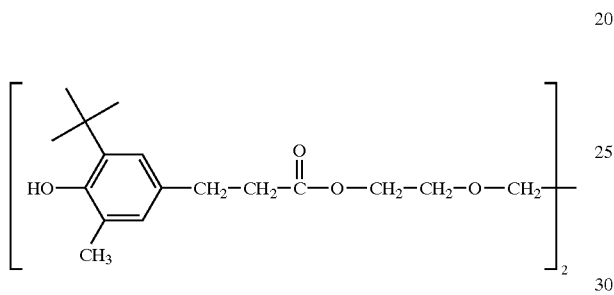

{3-(1,1-dimethylethyl)-4-hydroxy-5-methyl-phenylpropanoic acid 1,2-ethanediylbis(oxy-2,1-ethanediyl)ester};

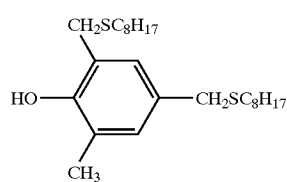

{2-methyl-4,6-bis[(octylthio)methyl]phenol};

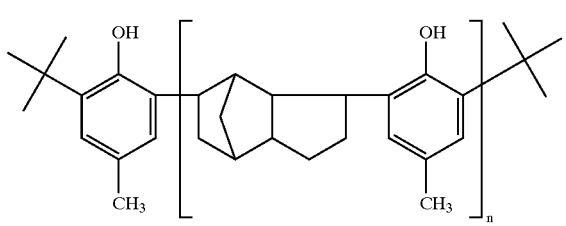

butylated reaction product of para-cresol and dicyclopentadiene (average molecular weight from 600 to 700)

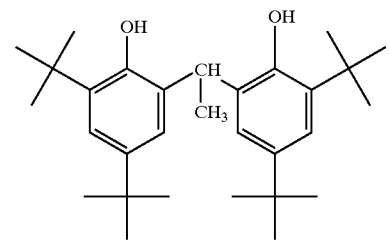

{2,2'-ethylidene-bis(4,6-di-tert-butylphenol)};

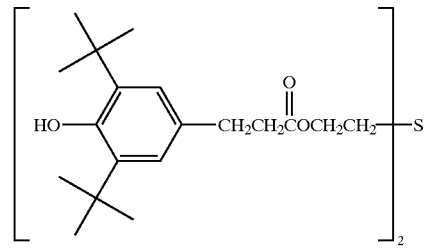

{3,5-bis(1,1-dimethylethyl)-4-hydroxy-phenylpropanoic acid thiodi-2,1-ethanediyl ester};

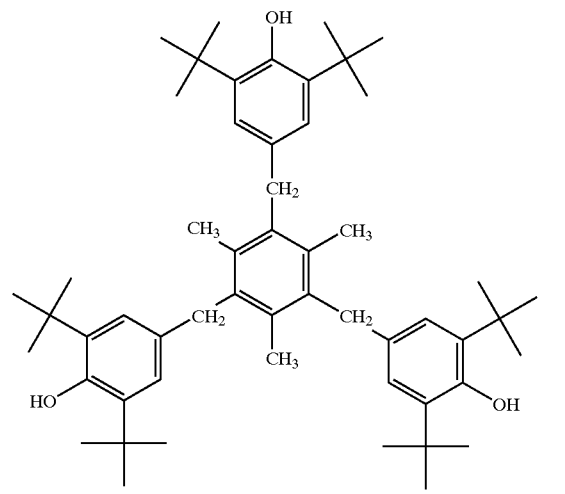

{4,4',4"-[(2,4,6-trimethyl-1,3,5-phenyltriyl)tris(methylene)]tris[2,6-bis(1,1-dimethylethyl)-phenol]};

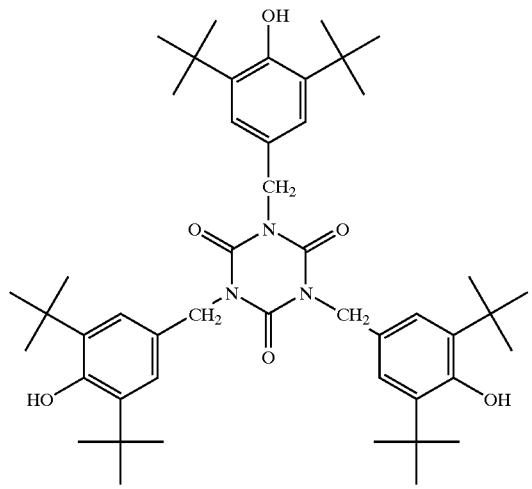

{1,3,5-tris[[3,5-bis(1,1-dimethylethyl)-4-hydroxyphenyl]methyl]-1,3,5-triazine-2,4,6(1H,3H,5H)-trione}.
Examples of phosphonates are those of formula I

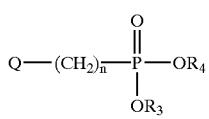

(I) wherein $R_3$ is hydrogen, $C_1$–$C_{20}$alkyl, unsubstituted or $C_1$–$C_4$alkyl-substituted phenyl or naphthyl, $R_4$ is hydrogen, $C_1$–$C_{20}$alkyl, unsubstituted or $C_1$–$C_4$alkyl-substituted phenyl or naphthyl; or is $M^{r+}/r$, $M^{r+}$ is an r-valent metal cation or the ammonium ion, n is 0, 1, 2, 3, 4, 5 or 6, and r is 1,2,3 or 4;

Q is hydrogen, —X—C(O)—OR$_7$, or a radical

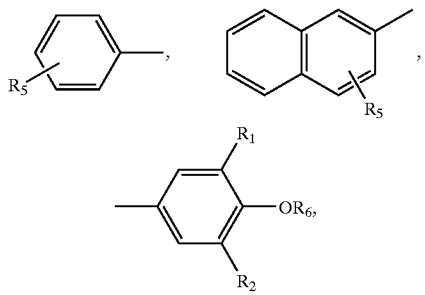

$R_1$ is isopropyl, tert-butyl, cyclohexyl, or cyclohexyl substituted by from 1 to 3 $C_1$–$C_4$alkyl groups, $R_2$ is hydrogen, $C_1$–$C_4$alkyl, cyclohexyl, or cyclohexyl substituted by from 1 to 3 $C_1$–$C_4$alkyl groups, $R_5$ is hydrogen, $C_1$–$C_{18}$alkyl, OH, halogen or $C_3$–$C_7$cycloalkyl;

$R_6$ is hydrogen, methyl, trimethylsilyl, benzyl, phenyl, sulfonyl or $C_1$–$C_{18}$alkyl;

$R_7$ is hydrogen, $C_1$–$C_{10}$alkyl or $C_3$–$C_7$cycloalkyl; and

X is phenylene, phenylene substituted by $C_1$–$C_4$alkyl groups, or cyclohexylene.

Preference is given to sterically hindered hydroxyphenylalkylphosphonic acid esters and semi-esters as disclosed, for example, in U.S. Pat. No. 4,778,840. Special preference is given to compounds of formula Ia

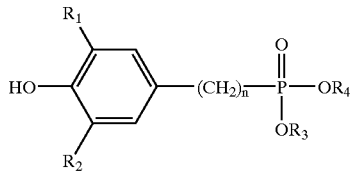

wherein $R_1$ is hydrogen, isopropyl, tert-butyl, cyclohexyl, or cyclohexyl substituted by from 1 to 3 $C_1$–$C_4$alkyl groups, $R_2$ is hydrogen, $C_1$–$C_4$alkyl, cyclohexyl, or cyclohexyl substituted by from 1 to 3 $C_1$–$C_4$alkyl groups, $R_3$ is $C_1$–$C_{20}$alkyl, unsubstituted or $C_1$–$C_4$alkyl-substituted phenyl or naphthyl;

$R_4$ is hydrogen, $C_1$–$C_{20}$alkyl, unsubstituted or $C_1$–$C_4$alkyl-substituted phenyl or naphthyl; or is $M^{r+}/r$, $M^{r+}$ is an r-valent metal cation, n is 1, 2, 3, 4, 5 or 6, and r is 1, 2, 3 or 4.

Halogen is fluorine, chlorine, bromine or iodine.

Suitable alkyl substituents having up to 18 carbon atoms are radicals such as methyl, ethyl, propyl, butyl, pentyl, hexyl and octyl, stearyl and also corresponding branched isomers; preference is given to $C_2$–$C_4$alkyl.

$C_1$–$C_4$Alkyl-substituted phenyl or naphthyl, which contains preferably from 1 to 3, especially 1 or 2, alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, 1-methylnaphthyl, 2-methylnaphthyl, 4-methylnaphthyl, 1,6-dimethylnaphthyl or 4-tert-butyl-naphthyl.

$C_1$–$C_4$Alkyl-substituted cyclohexyl, which contains preferably from 1 to 3, especially 1 or 2, branched or unbranched alkyl radicals, is, for example, methylcyclohexyl, dimethylcyclohexyl, trimethylcyclohexyl or tert-butylcyclohexyl.

A mono-, di-, tri- or tetra-valent metal cation is preferably an alkali metal, alkaline earth metal, heavy metal or aluminium cation, for example $Na^+$, $K^+$, $Mg^{++}$, $Ca^{++}$, $Ba^{++}$, $Zn^{++}$, $Al^{+++}$ or $Ti^{++++}$. Special preference is given to $Ca^{++}$.

Preferred compounds of formula I are those which have at least one tert-butyl group as radical $R_1$ or $R_2$. Special preference is given to compounds wherein $R_1$ and $R_2$ are both tert-butyl.

n is preferably 1 or 2, especially 1.

Preference is likewise given to compounds of formulae II, III, IV, V and VI

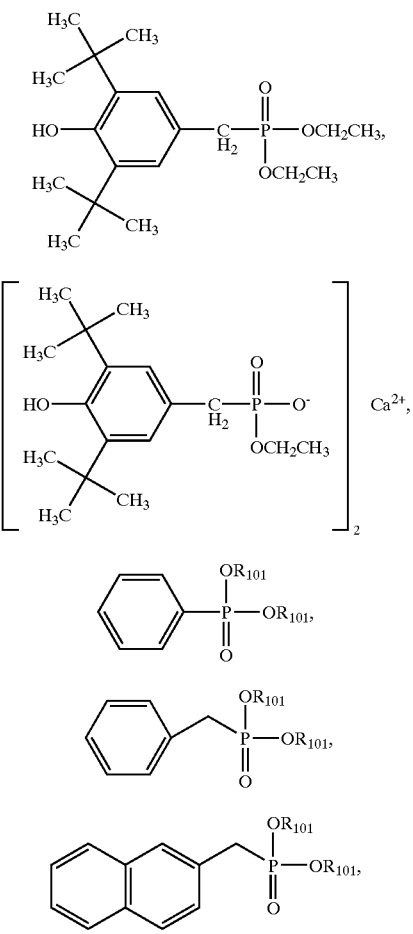

wherein each $R_{101}$ is independently of the other hydrogen or $M^{r+}/r$. Meanings of $M^{r+}/r$ have already been given hereinbefore.

The compound of formula II is commercially available under the name Irganox® 222 (Ciba Specialty Chemicals) and that of formula III under the name Irganox® 1425 (Ciba Specialty Chemicals).

Compounds IV, V and VI are, in some cases, commercially available or can be prepared according to standard methods.

Especially preferred phosphonates are dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, 3,5-di-tert-butyl-4-hydroxybenzylphosphonic acid monoethyl ester calcium salt. Very special preference is given to diethyl 3,5-di-tert-butyl-4-hydroxybenzylphosphonate.

Organic phosphites and phosphonites are likewise known as stabilisers for plastics. They are especially used as processing stabilisers for polyolefins.

They are mainly aromatic phosphites and phosphonites. Examples thereof are triphenyl phosphite, diphenyl alkyl phosphites, phenyl dialkyl phosphites, tris(diphenyl alkyl phosphite)amines, tris(nonylphenyl)phosphite, trilauryl phosphite, trioctadecyl phosphite, distearylpentaerythritol diphosphite, tris(2,4-di-tert-butylphenyl)phosphite, bis(2,4-di-tert-butylphenyl)pentaerythritol diphosphite, tristearyl-sorbitol triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4,6-tris-tert-butylphenoxy)-2,4,8,10-tetraoxa-3,9-diphosphaspiro[5,5]undecane, 2,4,6-tris-tert-butylphenyl-2-butyl-2-ethyl-1,3-propanediol phosphite and 2,2'-ethylidene-bis(4,6-di-tert-butylphenyl)fluorophosphite.

Special preference is given to the use of the following phosphites:

tris(2,4-di-tert-butylphenyl)phosphite,

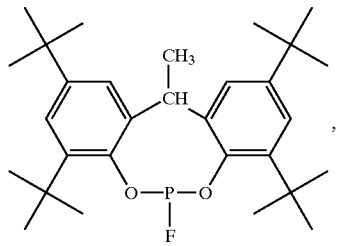

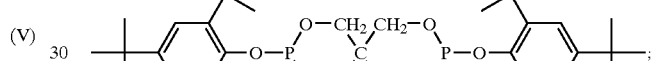

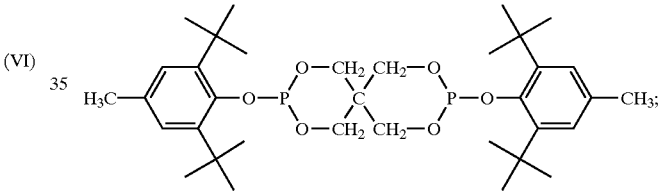

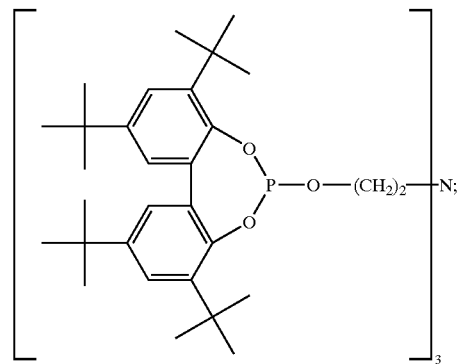

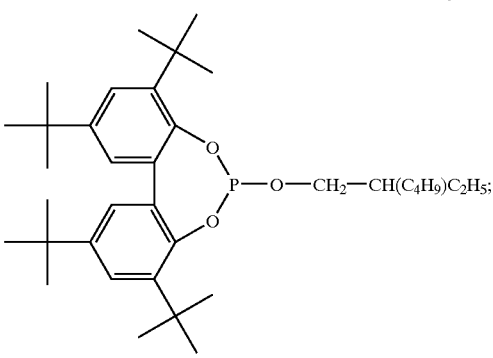

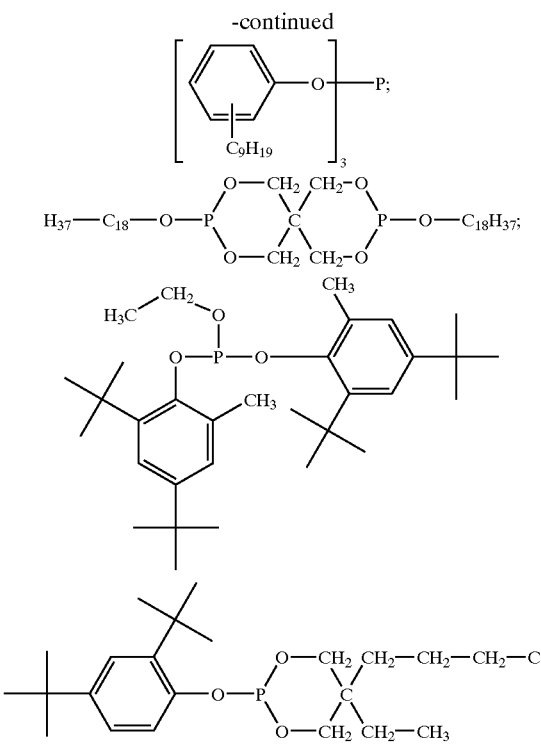

Very special preference is given to the use of tris(2,4-di-tert-butylphenyl)phosphite.

Benzofuranones and indolinones are described, for example, in U.S. Pat. No. 4,325,863; U.S. Pat. No. 4,338,244; U.S. Pat. No. 5,175,312, U.S. Pat. No. 5,216,052; U.S. Pat. No. 5,252,643; DE-A-4 316 61 1; DE-A-4 316 622; DE-A-4 316 876; EP-A-0 589 839 or EP-A-0 591 102. Preference is given to 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one and 3-(2,3-dimethylphenyl)-5,7-di-tert-butyl-benzofuran-2-one.

In addition to the processing stabilisers mentioned hereinbefore, further additives may also be included. Examples thereof are mentioned hereinafter.

UV Absorbers and Light Stabilisers 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]benzotriazole with polyethylene glycol 300; [R—CH$_2$CH$_2$—COO—CH$_2$CH$_2$$\frac{}{}$]$_2$ in which R=3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)phenyl] benzotriazole; 2-[2'-hydroxy-3'-(1,1,3,3-tetramethylbutyl)-5'-(α,α-dimethylbenzyl)phenyl]benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of unsubstituted or substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

Acrylates, for example α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methylindoline.

Nickel compounds, for example nickel complexes of 2,2'-thio-bis[4-(1,1,3,3-tetramethylbutyl)-phenol], such as the 1:1 or 1:2 complex, optionally with additional ligands, such as n-butyl-amine, triethanolamine or N-cyclohexyldiethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenyl-undecyl ketoxime, nickel complexes of 1-phenyl-4-lauroyl-5-hydroxypyrazole, optionally with additional ligands.

Sterically hindered amines, for example bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, n-butyl-3,5-di-tert-butyl-4-hydroxybenzylmalonic acid bis(1,2,2,6,6-pentamethylpiperidyl)ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl) hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane- 2,4-dione, bis(1-octyloxy-2,2,6,6-tetramethylpiperidyl) sebacate, bis(1-octyloxy-2,2,6,6-tetramethylpiperidyl) succinate, linear or cyclic condensation products of N,N'-bis(2,2,6,6-tetramethyl-4-piperidyl)hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro-[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyl)hexamethylenediamine and 4-cyclohexylamino-2,6-dichloro-1,3,5-triazine, condensation product of 1,2-bis(3-aminopropylamino)ethane and 2,4,6-trichloro-1,3,5-triazine and 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic anhydride α-olefin copolymer and 2,2,6,6-tetramethyl-4-aminopiperidine or 1,2,2,6,6-pentamethyl-4-aminopiperidine.

Oxalic acid diamides, for example 4,4'-dioctyloxy oxanilide, 2,2'-diethoxy oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl)oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and also of o- and p-ethoxy-di-substituted oxanilides.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy-tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide, oxanilide, isophthalic acid dihydrazide, sebacic acid bisphenylhydrazide, N,N'-diacetyladipic acid dihydrazide, N,N'-bis-salicyloyloxalic acid dihydrazide, N,N'-bis-salicyloylthiopropionic acid dihydrazide.

Nucleating agents, for example inorganic substances, for example talc, metal oxides, such as titanium dioxide or magnesium oxide, phosphates, carbonates or sulfates of preferably alkaline earth metals; organic compounds, such as mono- or poly-carboxylic acids and their salts, for example 4-tert-butylbenzoic acid, adipic acid, diphenylacetic acid, sodium succinate or sodium benzoate; polymeric compounds, for example ionic copolymerisates ("ionomers").

Fillers and reinforcing agents, for example calcium carbonate, silicates, glass fibres, glass beads, talc, kaolin, mica, barium sulfate, metal oxides and hydroxides, carbon black, graphite, wood powders, and powders and fibres of other natural products, synthetic fibres.

Other additives, for example plasticisers, lubricants, emulsifiers, pigments, rheology additives, catalysts, flow auxiliaries, optical brighteners, flame retardants, antistatics, blowing agents.

Special preference is given to a composition comprising
  a) a polyolefin material recycled from used plastics fuel containers;
  b) at least one di- or poly-functional (co)polymer or (co)oligomer selected from the group of homo- and co-polymers of ethylene or propylene, butadiene, isoprene and polysiloxane, wherein the functional group is a carbon-carbon double bond, an epoxy group, an amine group, a carboxylic acid group, a carboxylic acid ester group or a carboxylic anhydride group, an OH group, an SH group or an isocyanate group.

Very special preference is given to a composition comprising
  a) a polyolefin plastics material recycled from used plastics fuel containers;
  b) at least one di- or poly-functional polysiloxane, wherein the functional group is an epoxy group or an amine group, and
  c) at least one phenolic anti-oxidant, phosphonate, phosphite, benzofuranone or a combination thereof.

The invention relates also to a method of increasing the molecular weight and/or improving the mechanical properties of a polyolefin or a vinyl polymer, which comprises adding to the polyolefin or vinylpolymer at least one di- or poly-functional (co)polymer or (co)oligomer having a glass transition temperature of less than 10° C., wherein the functional group is a carbon-carbon double bond, an epoxy group, an amine group, a carboxylic acid group, a carboxylic acid ester group or a carboxylic anhydride group, an OH group, an SH group or an isocyanate group, and a multifunctional epoxide, which is different from the di- or poly-functional (co)polymer or (co)oligomer wherein the functional group is an epoxy group.

If the polymer is a recyclate the addition of a multifunctional epoxide is not necessary. For the components the definitions and preferences already mentioned hereinbefore apply thereto.

The addition to the polyolefin and vinyl polymer can be performed in any conventional blending apparatus wherein the polymer is melted and mixed thoroughly with the additives. Suitable apparatus, which are mixers, kneaders and extruders, are known to the person skilled in the art.

The method is preferably so carried out that the addition is performed during processing in an extruder.

When a plurality of components are added, they may be pre-mixed or added individually.

The method is preferably so carried out that the maximum temperature of the melt is from 180° C. to 320° C.

Heating above the melting point or glass transition point is usually carried out with stirring until the mixture has a homogeneous distribution. The temperature is governed by the polymer used. Preference is given to working at approximately from 50° C. to 100° C. above the melting temperature or glass transition temperature.

The processing apparatus is preferably a single-screw extruder, twin-screw extruder, planetary spindle extruder, ring extruder or co-kneader having at least one vent zone, to which a partial vacuum is applied.

Preference is given to a method wherein a partial vacuum of less than 250 mbar, especially less than 100 mbar and more especially less than 50 mbar, is applied to the vent zone.

Preference is likewise given to a method wherein the processing apparatus is a closely intermeshing twin-screw extruder or ring extruder having screws that rotate in the same direction and having a feed zone, a melting zone, at least one vent zone and a discharge zone, the vent zone being separated from the melting zone or from a further vent zone by a melt plug.

The said separation by a melt plug can be realised, for example, by a combination of a kneading element and a reverse-conveying screw element.

The invention relates also to polyolefin or vinyl polymer plastics articles obtainable by the methods mentioned hereinbefore.

The invention also relates to the use of a di- or poly-functional (co)polymer or (co)oligomer selected from the group of homo- and co-polymers of ethylene or propylene, butadiene, isoprene and polysiloxane, wherein the functional group is a carbon-carbon double bond, an epoxy group, an amine group, a carboxylic acid group, a carboxylic acid ester group or a carboxylic anhydride group, an OH group, an SH group or an isocyanate group, and a multi-functional epoxide, which is different from the di- or poly-functional (co)polymer or (co)oligomer wherein the functional group is an epoxy group, in increasing the molecular weight and/or improving the mechanical properties of polyolefins and vinyl polymers.

The present invention likewise relates to the use of a di- or poly-functional (co)polymer or (co)oligomer having a glass transition temperature of less than 10° C., wherein the functional group is a carbon-carbon double bond, an epoxy group, an amine group, a carboxylic acid group, a carboxylic acid ester group or a carboxylic anhydride group, an OH group, an SH group or an isocyanate group, in increasing the molecular weight and/or improving the mechanical properties of recycled polyolefin and vinyl polymer materials.

The Examples that follow illustrate the invention.

RECYCLED PLASTICS MATERIAL FOR EXAMPLES 1 AND 2

Recycled HDPE from uncoated petrol PFCs, previously cleaned by solvent extraction and additionally treated by extrusion, melt filtration (100 μm) and subsequent granulation.

Example 1

Improvement of Properties of Recycled Polyethylene 1.4 kg of each of the compositions listed in Table 1 are processed in vacuo (3 mbar) at 240° C. and 80 rev./min. in a ZSK 25 twin-screw kneader (throughput 5.0 kg/h). All constituents of the formulations are introduced at the beginning enclosed in the form of a premix. The polymer melt is extruded through a single-aperture die (diameter=2.8 mm) to form a strand which, after being solidified by cooling in a water bath, is granulated. The melt flow index of the granules is measured using a Göttfert MP-D (ISO 1133) melt flow index test apparatus. The material is then processed in an injection-moulding machine into tensile impact test bars according to DIN 53448, Form A, and notched parallel bars according to ISO 180, 1A.

The test bars are mechanically tested in respect of:
tensile strength
Izod notched bar impact strength at −40° C. (low temperature impact strength).

TABLE 1

| Specimen | Additives | MFR (190° C./ 21.6 kg) | Izod notched bar impact strength at −40° C. [KJ/m$^2$] | Tensile strength [N/mm$^2$] |
|---|---|---|---|---|
| Comparison sample | 0.1% Irganox ® 1010<br>0.1% Irgafos ® 168 | 6.6 | 55.5 | 29.9 |
| 1 | 0.35% Araldite ® GT7072<br>2.0% Tegomer ® E-Si 2330<br>0.0375% Irganox ® 1010<br>0.0375% Irgatos ® 168<br>0.015% calcium stearate<br>0.06% calcium oxide | 4.0 | 74.0 | 31.6 |
| 2 | 0.35% Araldite ® GT7072<br>3.0% Tegomer ® E-Si 2330<br>0.0375% Irganox ® 1010<br>0.0375% Irgafos ® 168<br>0.015% calcium stearate<br>0.06% calcium oxide | 5.3 | 74.4 | 33.0 |
| 3 | 0.5% Araldite ® MT 0163<br>2.0% Tegomer ® A-Si 2322<br>0.2% Irganox ® B 225 | 4.1 | 84.0 | 32.7 |

Example 2

Improvement of Properties of Recycled Polyethylene 2.0 kg of each of the polyethylene specimens listed in Table 2 are processed in vacuo (260 mbar) at 260–270° C. and 120 rev./min. in a ZSK 25 twin-screw kneader (throughput 5.0 kg/h). All constituents of the formulations are introduced at the beginning enclosed in the form of a premix. The polymer melt is extruded through a single-aperture die to form a strand which, after being solidified by cooling in a water bath, is granulated. The material is then processed in an injection-moulding machine into tensile impact test bars according to DIN 53448, Form A.

TABLE 2

| Specimen | Additives | Tensile impact strength [KJ/m$^2$] | Elongation at break [%] |
|---|---|---|---|
| Comparison sample | none | 384 | 73 |
| 4 | 0.35% Araldite ® GT7072<br>0.0375% Irganox ® 1010<br>0.0375% Irgafos ® 168<br>0.015% calcium stearate<br>0.06% calcium oxide<br>1.0% Hycar ® ATBN 1300 x 21 | 590 | 153 |
| 5 | 0.35% Araldite ® GT7072<br>0.0375% Irganox ® 1010<br>0.0375% Irgafos ® 168<br>0.015% calcium stearate<br>0.06% calcium oxide<br>1.0% Hycar ® ATBN 1300 x 45 | 476 | 115 |
| 6 | 0.5% Araldite ® MT 0163<br>1.0% Hycar ® ATBN 1300 x 45<br>0.2% Irganox ® B 225 | 482 | 112 |

Example 3

Increase in Molecular Weight of Virgin Polyethylene Material (HDPE)

Polymer Used: Hostalen® GM6255 Having an MFR (190/21.6) of 6.3 g/10 Min. From Hostalen Polyethylen GmbH 2 kg of each of the compositions listed in Table 3 are processed at max. 254° C., at 100 rev./min. and at 4 kg/h in a ZSK25 twin-screw extruder. All constituents of the formulations are introduced in the form of a premix. The polymer melt is extruded through a single-aperture die (d=2.8 mm) to form a strand which, after being solidified by cooling in a water bath, is granulated. The melt flow index (MFR) of the granules is measured using a Göttfert MP-D test apparatus in accordance with ISO 1133. The results are summarised in Table 3.

TABLE 3

| Specimen | Formulation | MFR (190/21.6) [g/10 min] |
|---|---|---|
| 7 | Hostaten ® GM6255 | 6.05 |
| 8 | Hostaten GM6255<br>2% Tegomer A-Si 2322<br>0.5% Araldite MT0163 | 5.42 |

Example 4

Increase in Molecular Weight of Virgin Polypropylene Material

Polymer Used: Novolen® 1106 Having an MFR (230/2.16): 1.94 g/10 Min. From Targor GmbH 2 kg of each of the compositions listed in Table 4 are processed at max. 234° C., at 100 rev./min. and at 4 kg/h in a ZSK25 twin-screw extruder. All constituents of the formulations are introduced in the form of a premix. The polymer melt is extruded through a single-aperture die (d=2.8 mm) to form a strand which, after being solidified by cooling in a water bath, is granulated. The melt flow index (MFR) of the granules is measured using a Göttfert MP-D test apparatus in accordance with ISO 1133. The results are summarised in Table 4.

TABLE 4

| Specimen | Formulation | MFR (230/21.6) [g/10 min.] |
|---|---|---|
| 9 | Novolen® 1106 | 2.33 |
| 10 | Novolen 1106<br>3% Hycar ATB 2000x173<br>0.5% Araldite MT0163 | 1.65 |
| 11 | Novolen 1106<br>3% Hycar ATBN 1300x21<br>0.5% Araldite MT0163 | 1.78 |

Example 5

Improvement of Properties of Virgin Polypropylene Material

Polymer Used: Novolen® 1106 Having an MFR (230/2.16): 1.94 g/10 min. From Targor GmbH 2 kg each of the compositions listed in Tables 5a and 5b are processed at max. 234° C., at 100 rev/min. and at 4 kg/h in a ZSK25 twin-screw extruder. All constituents of the formulations are introduced in the form of a premix. The polymer melt is extruded through a single-aperture die (d=2.8 mm) to form a strand which, after being solidified by cooling in a water bath, is granulated. The melt flow index (MFR) of the granules is measured using a Göttfert MP-D test apparatus in accordance with ISO 1133. The material is then processed in an injection-moulding machine (Arburg 320S) into tensile impact test bars according to DIN 53448, Form A. The test bars are tested in respect of tensile impact strength at room temperature (23° C.) and at −30° C. using a Zwick PSW 5101 test apparatus having a 25J pendulum. The results are summarised in Table 5a.

TABLE 5a

| Specimen | Formulation | MFR (230/2.16) [g/10 min.] | Tensile impact strength 23° C. [kJ/m$^2$] | Tensile impact strength −30° C. [kJ/m$^2$] |
|---|---|---|---|---|
| 12 | Novolen 1106 | 2.33 | 475 | 139 |
| 13 | Novolen 1106<br>3% Hycar ETBN 1300x44<br>0.5% Araldite MT0163 | 1.99 | 474 | 196 |

By analogy with DIN 53455, the tensile strength and elongation at break are additionally determined in the case of the following compositions, using a tensile impact test bar (Table 5b):

TABLE 5b

| Specimen | Formulation | Tensile impact strength, room temp. [kJ/m$^2$] | Tensile impact strength, −30° C. [kJ/m$^2$] | Tensile strength [N/mm$^2$] | Elongation at break [%] |
|---|---|---|---|---|---|
| 14 | Novolen 1106 | 475 | 139 | 35.4 | 1051 |
| 15 | Novolen 1106<br>2% Tegomer A-Si 2322<br>0.5% Araldite MT0163 | 622 | 244 | 36.8 | 1049 |
| 16 | Novolen 1106<br>3% Royaltuf 498<br>0.5% Araldite MT0163 | 446 | 182 | 36.9 | 1094 |

Example 6
Increase in Molecular Weight of Virgin Polystyrene Material

Polymer Used: Polystyrene 165H, Transparent, Having an MFR (200/5): 3.56 g/10 min. From BASF 2 kg of each of the compositions listed in Table 6 are processed at max. 200° C., at 100 rev./min. and at 4 kg/h in a ZSK25 twin-screw extruder. All constituents of the formulations are introduced in the form of a premix. The polymer melt is extruded through a single-aperture die (d=2.8 mm) to form a strand which, after being solidified by cooling in a water bath, is granulated. The melt flow index (MFR) of the granules is measured using a Göttfert MP-D test apparatus in accordance with ISO 1133. The results are summarised in Table 6.

TABLE 6

| Specimen | Formulation | MFR (200/5) [g/10 min.] |
|---|---|---|
| 17 | Polystyrene 165H, transparent | 4.77 |
| 18 | Polystyrene 165H, transparent 3% HyCar ATBN 0.5% Araldite MT0163 | 3.15 |

Example 7
Improvement of Properties of Virgin Polystyrene Material

Polymer Used: Polystyrene 165H, Transparent, Having an MFR (200/5): 3.56 g/10 min. From BASF 2 kg of each of the compositions listed in Table 7 are processed at max. 200° C., at 100 rev./min. and at 4 kg/h in a ZSK25 twin-screw extruder. All constituents of the formulations are introduced in the form of a premix. The polymer melt is extruded through a single-aperture die (d=2.8 mm) to form a strand which, after being solidified by cooling in a water bath, is granulated. The melt flow index (MFR) of the granules is measured using a Göttfert MP-D test apparatus in accordance with ISO 1133. The material is then processed in an injection-moulding machine (Arburg 320S) into parallel bars according to ISO 180, 1A. The test bars are notched and tested in respect of Izod notched bar impact strength at room temperature (23° C.) and at −30° C. using a Zwick PSW 5110 test apparatus having a 5.5J pendulum. The results are summarised in Table 7.

TABLE 7

| Specimen | Formulation | MFR (200/5) [g/10 min] | Izod notched bar impact strength, 25° C. [kJ/m$^2$] | Izod notched bar impact strength, −30° C. [kJ/m$^2$] |
|---|---|---|---|---|
| 19 | | | | |
| 20 | Polystyrene 165H, transparent | 4.77 | 4.65 | 3.47 |
| 21 | Polystyrene 165H, transparent 3% Royaltuf 498 0.5% Araldite MT0163 | 3.26 | 5.28 | 4.22 |
| 22 | Polystyrene 165H, transparent 3% Tegomer A-Si 2322 0.5% Araldite MT0163 | * | 5.77 | 4.65 |

*: measurement invalidated by siloxane lubricant

Example 8
Improvement of Properties of Virgin Polyethylene Material

Polymer Used: Eltex® B40201106 Having an MFR (190/21.6): 71.8 g/10 Min. From Solvay 2 kg of each of the compositions listed in Table 8 are processed at max. 231° C., at 100 rev./min. and at 4 kg/h in a ZSK25 twin-screw extruder. All constituents of the formulations are introduced in the form of a premix. The polymer melt is extruded through a single-aperture die (d=2.8 mm) to form a strand which, after being solidified by cooling in a water bath, is granulated. The melt flow index (MFR) of the granules is measured using a Göttfert MP-D test apparatus in accordance with ISO 1133. The material is then processed in an injection-moulding machine (Arburg 320S) into tensile impact test bars according to DIN 53448, Form A. By analogy with DIN 53455, the test bars are tested in respect of tensile strength and elongation at break. The results are summarised in Table 8.

TABLE 8

| Specimen | Formulation | MFR (230/2.16) [g/10 Min] | Tensile strength [N/mm$^2$] | Elongation at break [%] |
|---|---|---|---|---|
| 23 | Eltex B4020 | 61.4 | 26.1 | 632 |
| 24 | Eltex B4020 3% Polybond 1009 0.5% Araldite MT0163 | 58.7 | 25.9 | 836 |

Example 9
Improvement of Properties of Recycled EPDM Materials

Polymer Used: Seculene® PPX8027SO Having an MFR (230/2.16): 5.75 g/10 Min. From BSB Braubach 2 kg of each of the compositions listed in Table 9 are processed at max. 221° C., at 100 rev./min. and at 4 kg/h in a ZSK25 twin-screw extruder. All constituents of the formulations are introduced in the form of a premix. The polymer melt is extruded through a single-aperture die (d=2.8 mm) to form a strand which, after being solidified by cooling in a water bath, is granulated. The melt flow index (MFR) of the granules is measured using a Göttfert MP-D test apparatus in accordance with ISO 1133. The material is then processed in an injection-moulding machine (Arburg 320S) into tensile impact test bars according to DIN 53448, Form A. By analogy with DIN 53455, the test bars are tested in respect of tensile strength and elongation at break. The results are summarised in Table 9.

TABLE 9

| Specimen | Formulation | MFR (230/2.16) [g/10 min.] | Tensile strength [N/mm$^2$] | Elongation at break [%] |
|---|---|---|---|---|
| 25 | Seculene ® PPX8027SO | 6.05 | 24.1 | 163 |
| 26 | Seculene ® PPX8027SO 3% Tegomer A-Si 2322 0.5% Araldite MT0163 | * | 21.9 | 206 |

*: value invalidated by siloxane lubricant

Products used

Irganox® 1010, phenolic anti-oxidant (Ciba Specialty Chemicals)

Irgafos® 168, phosphite (Ciba Specialty Chemicals)

Araldite® GT 7072, bifunctional oligomeric epoxide based on bisphenol A (Ciba Specialty Chemicals)

Araldite® MT 0163, solid tetrafunctional epoxide (Ciba Specialty Chemicals)

Tegomer® E-Si 2330: epoxyalkylpolydimethylsiloxane (Goldschmidt AG)

Tegomer® A-Si 2322: aminoalkylpolydimethylsiloxane (Goldschmidt AG)

Hycar® ATBN 1300×21 and Hycar® ATBN 1300×45: amine-terminated butadiene-acrylonitrile copolymer (BF Goodrich)

Hycar® ATB 2000×173: amine-terminated polybutadiene (BF Goodrich)

Hycar@ ETBN 1300×44: epoxy-terminated butadiene-acrylonitrile copolymer (BF Goodrich)

Royaltuf® 498: maleic anhydride functionalised EPDM (Uniroyal)

Polybond® 1009: acrylic acid functionalised polyethylene (HDPE) (Uniroyal)

What is claimed is:

1. A composition comprising
   a) at least one polyolefin or vinyl polymer;
   b) at least one di- or poly-functional siloxane polymer containing terminal amine or epoxy functional groups and having a glass transition temperature of less than 10° C., and

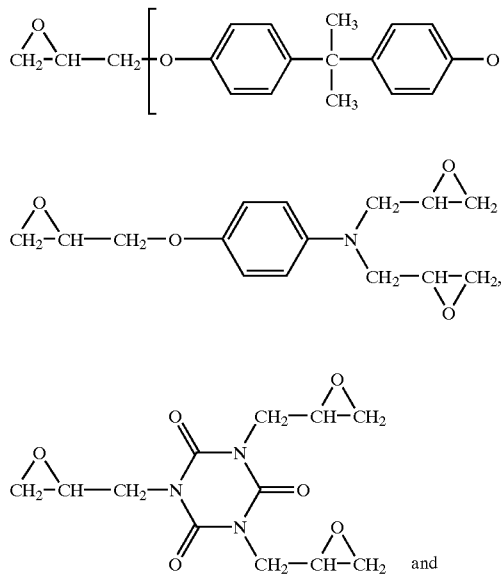

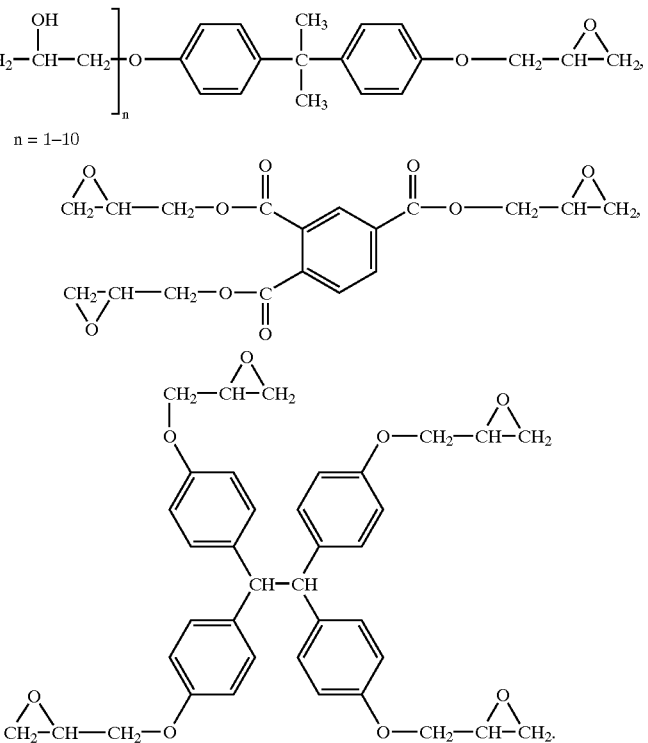

c) a multifunctional epoxide which is different from the siloxane polymer containing terminal epoxy functional groups.

2. A composition comprising
   a) a recycled material of at least one polyolefin or vinyl polymer;
   b) at least one di- or poly-functional siloxane polymer containing terminal amine or epoxy functional groups and having a glass transition temperature of less than 10° C.

3. A composition according to claim 1 wherein the polyolefin or vinyl polymer is a recycled material.

4. A composition according to claim 1 wherein the polyolefin is polyethylene, polypropylene, an ethylene-propylene copolymer or a polyethylene/polypropylene mixture.

5. A composition according to claim 1 wherein the multifunctional epoxide component is an aromatic epoxide.

6. A composition according to claim 1 wherein the multifunctional epoxide is selected from the consisting of

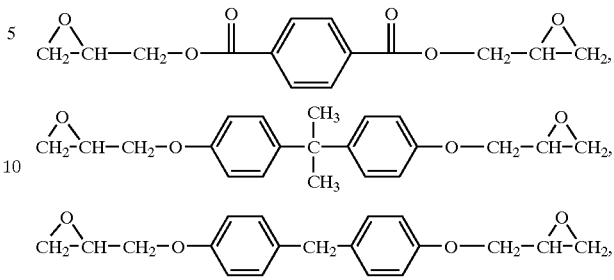

liquid diglycidyl ethers of bisphenol F,

7. A composition according to claim 1 wherein the siloxane polymer is present in an amount of from 0.1 to 20% by weight, based on the polyolefin or vinyl polymer.

8. A composition according to claim 4 wherein the multifunctional epoxide is present in an amount of from 0.01 to 5% by weight, based on the polyolefin or vinyl polymer.

9. A composition according to claim 1 which also comprises a phenolic anti-oxidant, a phosphonate, a phosphite or a benzofuranone.

10. A composition according to claim 2 in which component a) is a polyolefin material recycled from used plastics fuel containers.

11. A composition according to claim 10 further comprising
   c) at least one phenolic anti-oxidant, phosphonate, phosphite, benzofuranone or a combination thereof.

* * * * *

UNITED STATES PATENT AND TRADEMARK OFFICE
CERTIFICATE OF CORRECTION

PATENT NO.   : 6,593,403 B1
DATED        : July 15, 2003
INVENTOR(S)  : Dirk Simon et al.

It is certified that error appears in the above-identified patent and that said Letters Patent is hereby corrected as shown below:

Title page,
Item [30], Foreign Application Priority Data, should read:
-- [30]   Foreign Application Priority Data
          Oct. 26, 1999  (CH)      1954/99 --.

Signed and Sealed this

Seventh Day of October, 2003

JAMES E. ROGAN
*Director of the United States Patent and Trademark Office*